Figure 1:
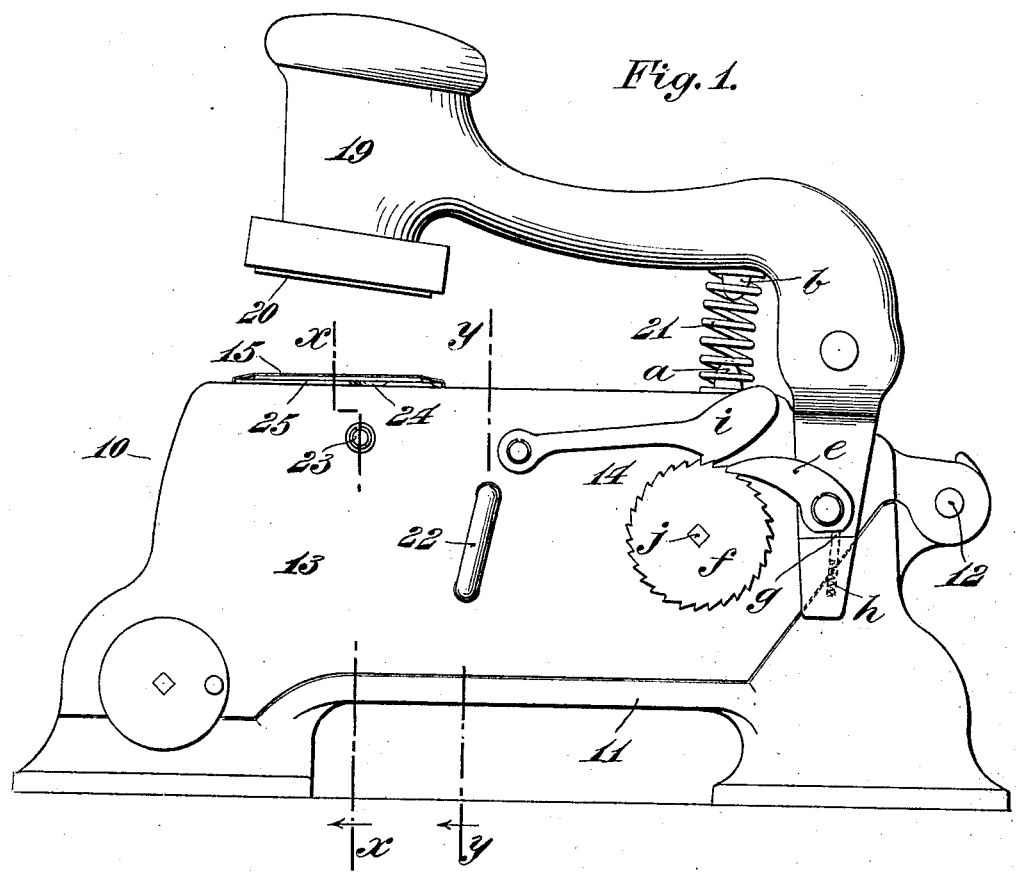

B. B. HILL.
DATING STAMP.
APPLICATION FILED JUNE 13, 1908

902,582.

Patented Nov. 3, 1908.

3 SHEETS—SHEET 1.

WITNESSES:
Thomas M. Smith
G. M. Connerton

INVENTOR
Benjamin B. Hill,
BY
J. Walter Douglas
ATTORNEY.

B. B. HILL.
DATING STAMP.
APPLICATION FILED JUNE 13, 1908.

902,582.

Patented Nov. 3, 1908.

3 SHEETS—SHEET 2.

WITNESSES:
Thomas M. Smith
G. M. Connerton

INVENTOR
Benjamin B. Hill
BY
J. Walter Douglas
ATTORNEY.

B. B. HILL.
DATING STAMP.
APPLICATION FILED JUNE 13, 1908.

902,582.

Patented Nov. 3, 1908.

3 SHEETS—SHEET 3.

WITNESSES:
Thomas M. Smith
G. M. Connerton

INVENTOR
Benjamin B. Hill,
BY
J. Walter Douglas
ATTORNEY.

UNITED STATES PATENT OFFICE.

BENJAMIN B. HILL, OF PHILADELPHIA, PENNSYLVANIA, ASSIGNOR TO THE B. B. HILL MANUFACTURING COMPANY, OF PHILADELPHIA PENNSYLVANIA, A CORPORATION OF PENNSYLVANIA.

DATING-STAMP.

No. 902,582.

Specification of Letters Patent.

Patented Nov. 3, 1908.

Application filed June 13, 1908. Serial No. 438,276.

*To all whom it may concern:*

Be it known that I, BENJAMIN B. HILL, a citizen of the United States, residing at the city of Philadelphia, in the county of Philadelphia and State of Pennsylvania, have invented certain new and useful Improvements in Dating-Stamps, of which the following is a specification.

My invention has relation to a dating stamp, for railroad and other uses for effectively and quickly stamping tickets and other similar articles; and in such connection it has more particularly the following advantage points in a dating stamp due to construction, first of the arrangement of matter and dates parallel to the stamp operating means; second of the arrangement of the hub for the impression or dating wheels in slots rather than being pinned to a stand or case; third of the arrangement of the hub for the impression or dating wheels to be adjustable to regulate the height thereof with respect to permanent matter of a die-plate employed in conjunction therewith; fourth of the arrangement of the said die-plate hinged to the stand or case and with projections on both ends of the said die-plate for respectively, holding securely the same in operative position when closed down over the dating or impression wheels and furnishing also means for the pivotal support of said plate to the stand, the said plate being provided with means for locking the impression or dating wheels against shifting in operative position as well as holding in proper relation to permanent matter of said plate during the stamping of an impression upon a ticket or other similar articles; fifth of the arrangement of a locking device for the case and stand adapted to control automatically the movements of the said die-plate within the case of the stamping head of the device; and sixth of the arrangement of indents or notches in the inner periphery of the series of impression or dating wheels to temporarily lock by means of pins mounted in the hub of said impression or dating wheels while an impression is being taken therefrom upon a ticket or other similar articles through passing an ink-ribbon over the type of said wheels and said ribbon acting in unison with and operated by the stamping head.

The nature, scope and characteristic features of my present invention over the prior art of the general type of dating stamps, as are well known, will be more fully understood from the accompanying drawings forming part hereof, in conjunction with the following description, in which—

Figure 2:
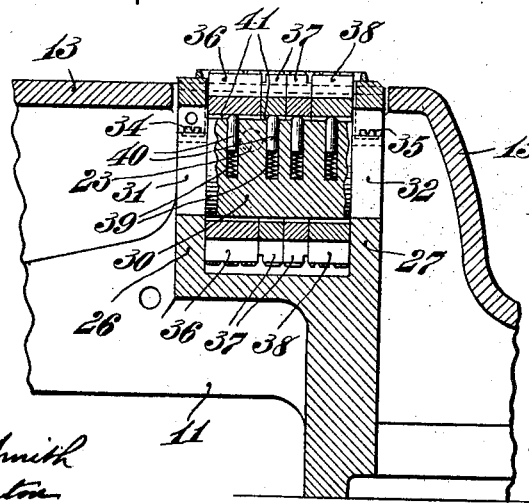
Figure 3:
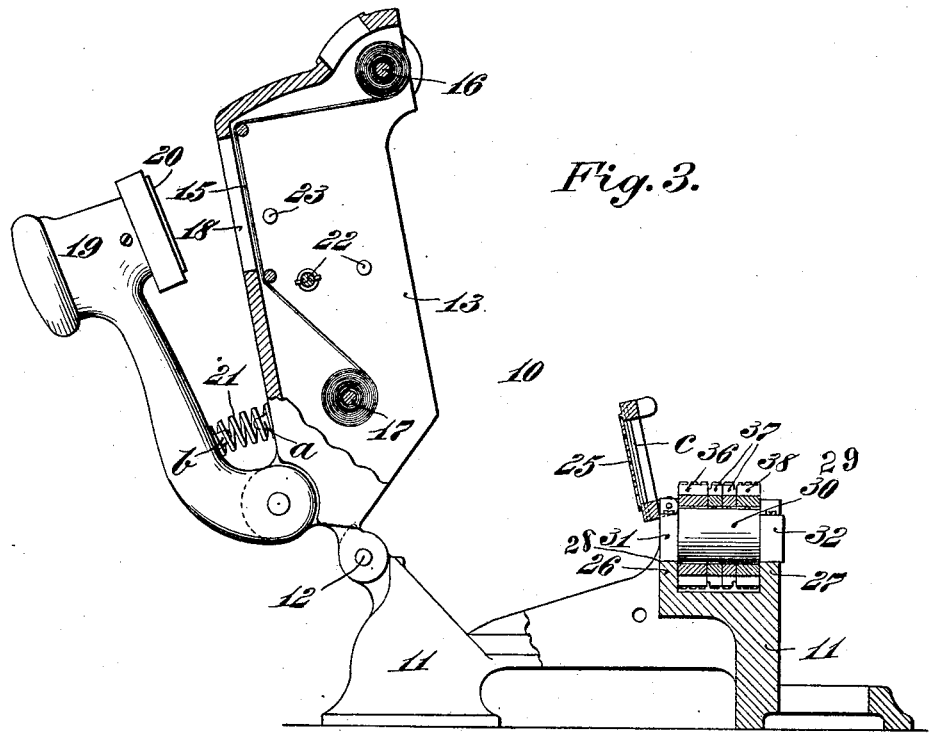
Figure 4:
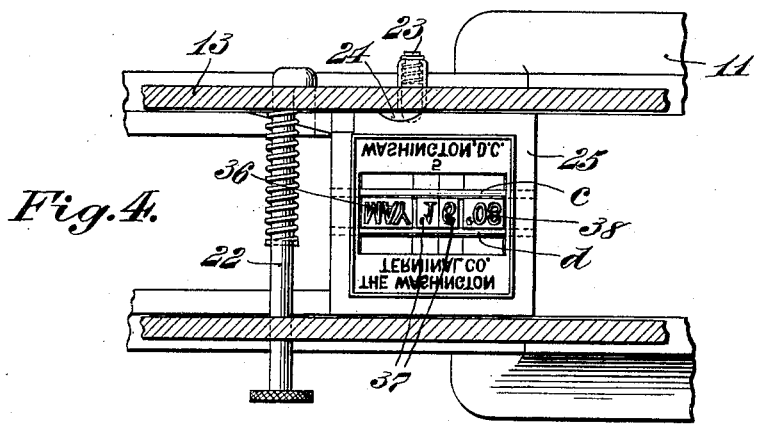
Figure 5:
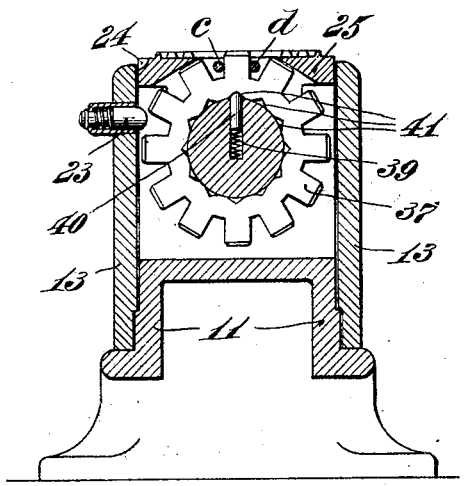
Figure 6:
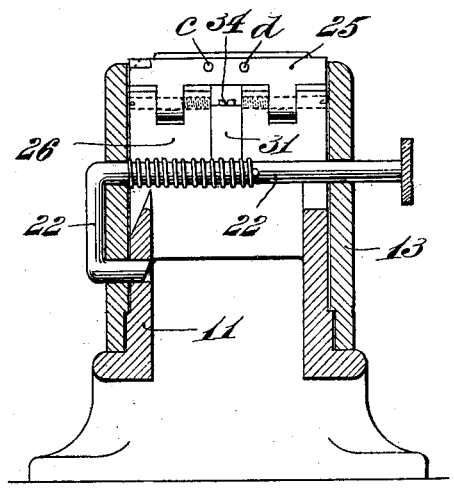
Figure 7:
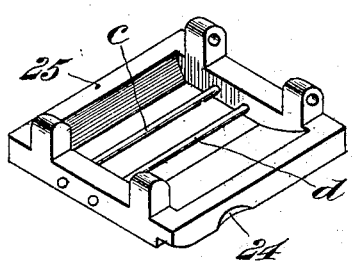
Figure 8:
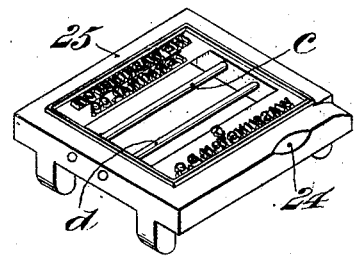
Figure 9:
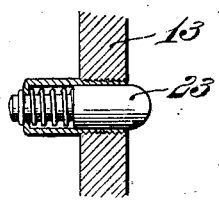

Figure 1 is a side elevational view of a dating stamp embodying main features of my said invention. Fig. 2 is a longitudinal sectional view of the front portion of the device, showing the impression or dating wheels and associated working parts thereof. Fig. 3 is a view partly in side elevation and partly in longitudinal section, showing the case and stamping head in raised positions and the die-plate also elevated. Fig. 4 is a fragmentary plan view partly in section of the die-plate and impression or dating wheels, showing the said plate closed down upon said wheels and locking the same to operative position. Figs. 5 and 6, are sectional views on the line $x$, $x$, and $y$, $y$, of Fig. 1. Figs. 7 and 8, are perspective views of the detail arrangement of the die-plate, showing the respective constructive faces thereof; and Fig. 9 is an enlarged detailed view, of the said die-plate raising means.

Referring to the drawings 10, represents the dating stamp, comprising the stand 11, hinged at 12, to an oblong telescoping case 13, adapted to embrace and protect the principal working parts of the stamp as well as carrying pawl-and-ratchet-mechanism 14, for operating an ink-ribbon 15, from one drum 16 onto the other drum 17, as clearly illustrated in Fig. 3. The case 13, in front is provided with an opening 18, along which passes the ink-ribbon 15, and above the case 13, is hinged the stamping head 19, with a pad case or pocket 20. The head 19, is normally maintained a proper distance from the top of the case 13, in an inoperative position by means of a coiled spring 21, the respective ends of which bear or seat with stops $a$ and $b$, of the case 13, and stamping head 19.

22 is a spring controlled locking bar extending through the case 13, and formed into an inverted U-shape and extending from the outside through the case 13, into the stand 11, as clearly shown in Fig. 6.

23, is a spring controlled plunger-stop provided in the side of the case 13, in the front portion and projecting thereinto. With the stamping head 19, case 13 thereof, and the die-plate 25, of the stand 11, occupying respectively, positions such as shown in Fig. 3, and it is desired to close down the die-plate, this is preferably accomplished manually, and the said case 13, and stand 11, at the same time and so as to permit the said plate to occupy a position, for example, as shown in Fig. 1. The plunger stop 23, will by the lowering of the head 19, and case 13, contact with the surface about the recess 24, of the die-plate 25, as the said stop 23, is normally under spring tension it will slip past said die-plate recess and take under the said plate, while such occupies an operative position as fully shown in Figs. 2 and 4, but when the die-plate 25, is to be raised after the case 13, by means of the spring controlled locking bar 22, has released it from the stand 11, the plunger stop 23, by the manual movement exerted upon the head 19, to effect such result, will slip along under but in contact with the die-plate 25, to a point beyond the middle when by a continued effort to lift the head 19, and its case 13, the said plate will be fully elevated with the head 19, so that it can occupy the position as clearly illustrated in Fig. 3.

In the forepart of the stand 11, is provided recessed uprights 26 and 27, having end vertical slots 28 and 29, for engaging the square tenons 31 and 32, of the hub 30, as clearly shown in Fig. 3. The square tenons of the hub 30, are secured to place by tightening screws 34 and 35, as clearly shown in Fig. 3, so that the hub can be adjusted up or down to bring the matter of said plate into proper alinement with the matter of certain type or dating wheels mounted on said hub. The series of notched impression or dating wheels 36, 37 and 38, mounted on the hub 30, are arranged so as to designate, respectively, months, days and years of the stamp as fully illustrated in Figs. 2, 3 and 4. This hub 30, is perforated with vertical openings 39, into which spring poised pins 40, are inserted and which pins project above the surface of the hub so as to enter indents or notches 41, provided at suitable distances apart in the inner periphery of the series of impression or dating wheels to temporarily lock said wheels against shifting while the hinged die-plate 25, pivotally connected with the rear upright 26, of the stand 11, is in an operative position in alinement with the type of said wheels projecting through the openings provided in the said die-plate 25. The transverse bars $c$ and $d$, of the plate 25 engage between the type of the series of notched impression or dating wheels, as clearly shown in Figs. 2, 3 and 4. With the case 13, closed down the series of impression or dating wheels are locked by said die-plate 25, so that by respectively up and down movements of the spring controlled stamping head 19, the ink-ribbon 15, is shifted by means of the pawl-and-ratchet-mechanism 14, thereof. The operating pawl $e$, of which mechanism is pivotally connected with the lower side of said head 19, and is held always positively in engagement with pinion $f$, by means of a spring positioned pin $g$, set into a pocket $h$, of the head and engaging the pawl $e$, under spring tension beyond the central vertical axis thereof, as clearly shown in Fig. 1. The locking gravity detent or pawl $i$, of the said mechanism is connected with the side of the case 13, as illustrated in Fig. 1, and reliably holds the said pinion $f$, mounted on the square end $j$, of the winding drum 17 for the ink-ribbon. The arrangement being such as to insure the positive feed of the ink-ribbon 15, over the alined surfaces of both die-plate and type of said wheels to quickly and effectively permit of an impression being obtained onto a ticket or other similar articles parallel to the movements of the stamping head and so that the stamped matter may be brought upon the ticket or other articles into a single line, for example, as clearly illustrated in Fig. 4, of the drawings.

Having thus described the nature and objects of my invention, what I claim as new and desire to secure by Letters Patent is:

1. A dating stamp, comprising a stand adapted to telescope with a case and the latter carrying an ink-ribbon, actuating means therefor, and a stamping-head, said stand provided with slotted uprights, tenons of a hub carrying type or dating wheels engaging therein, said wheels being arranged so that types thereof are adapted to be brought into a single line, and in parallel with movements of said stamping head, a slotted die-plate and means to control the actuation of the plate with movements of said case and head.

2. A dating stamp, comprising a stand adapted to telescope with a case and having slotted uprights for engaging the tenons of a hub carrying impression or dating wheels adapted to center with a slotted die-plate, said hub and wheels provided with locking means and means for raising said die-plate with release of said case from said stand.

3. A dating stamp, comprising a stand adapted to telescope with a case and having slotted uprights, a hub with square tenons adapted to be mounted in said slotted uprights, said hub carrying a series of impression or dating wheels adapted to center with a slotted die-plate hinged to one of said uprights, said hub and wheels combined providing locking means for said wheels, while said die-plate is released therefrom and said die-plate adapted to be raised by means connected with and operated from said case.

4. A dating stamp, comprising a stand adapted to telescope with a case and having slotted uprights to engage tenons of a hub having impression or dating wheels detachably locked thereto, said wheels centering with a slotted die-plate hinged to one of said uprights, means in connection with said wheels and hub for locking while the slotted die-plate is in an inoperative position, means connected with said case for raising the same from said stand and of lifting said die-plate, an ink-ribbon mounted in said case, pawl and ratchet mechanism connected therewith for shifting the ribbon over said wheels and die-plate and a stamping-head connected with said case and arranged to positively operate said mechanism.

5. A dating stamp provided with a stand having a hinged telescoping case and pivoted stamping-head, said case carrying an inking-ribbon and step-by-step operating mechanism, means controlled by said head for actuating said mechanism, said stand provided with slotted uprights for the tenons of a hub fitting the same against movement and said hub carrying impression or dating wheels, a slotted die-plate for locking said wheels in operative position and means to permit of the freeing of said die-plate from its locked position.

6. A dating stamp provided with a stand having slotted uprights for the square ends of a hub carrying notched impression or dating wheels, a die-plate provided with openings and bars adapted to engage the notches of said wheels, said die-plate adapted to be raised with an embracing case for said stand, said case carrying an ink-ribbon for said wheels and operatively connected therewith and a stamping-head for effecting an impression from said wheels and controlling movements of said ribbon over said wheels.

7. A dating stamp having a case telescoping with a stand and carrying a hinged slotted die-plate and impression or dating wheels, means for preventing shifting of the wheels independently of said die-plate, said case provided with projecting spring means adapted to pass said plate in one position, and to elevate said plate and to free the same from said impression or dating wheels, when moved into the other position.

In witness whereof, I have hereunto set my signature in the presence of two subscribing witnesses.

BENJAMIN B. HILL.

Witnesses:
J. WALTER DOUGLASS,
M. H. CADWALLADER.